April 9, 1957
H. C. HADLEY
2,787,878
DRAFT ARRANGEMENT FOR CORN PICKERS
Filed May 25, 1955
2 Sheets-Sheet 1
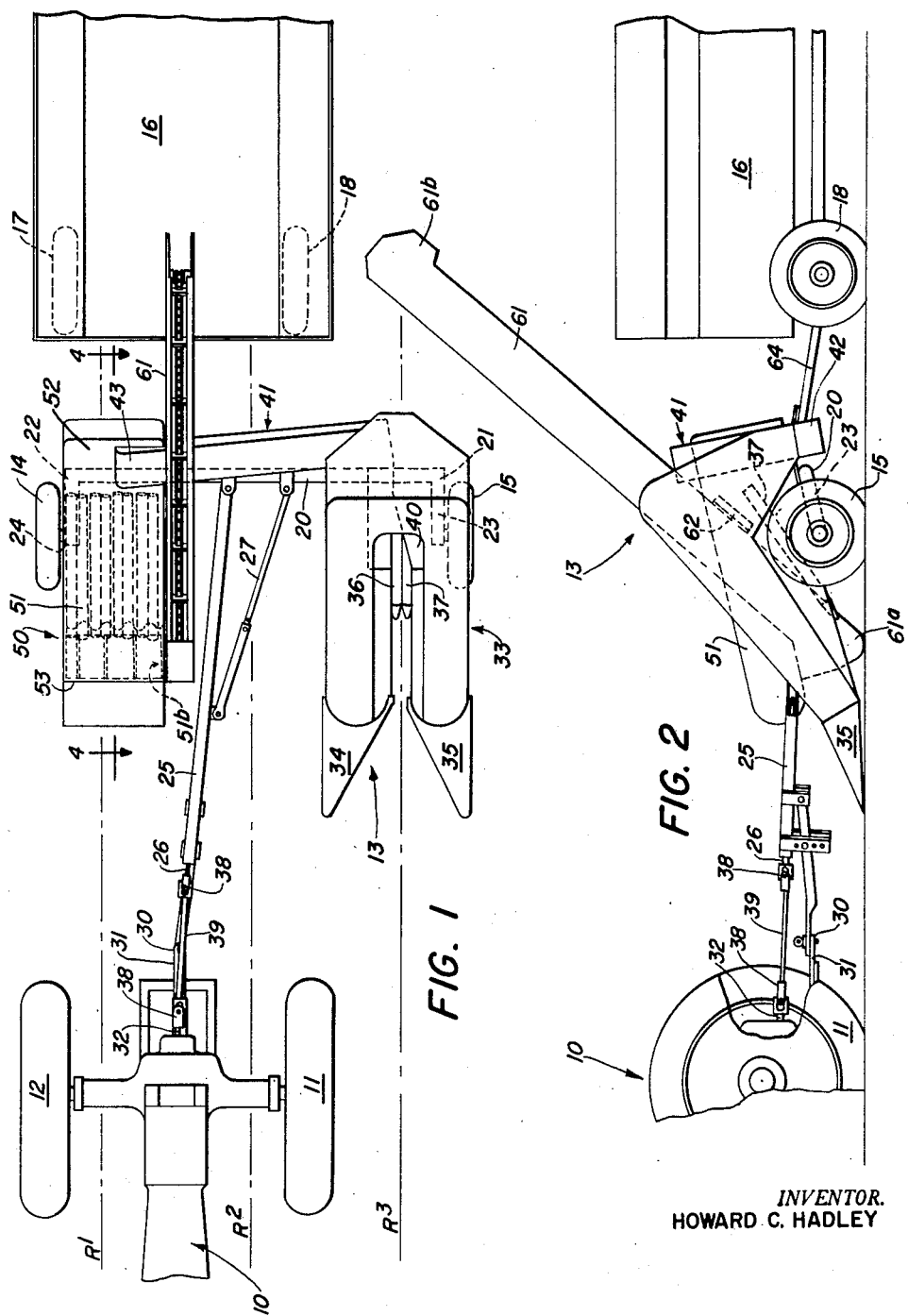
INVENTOR.
HOWARD C. HADLEY

INVENTOR.
HOWARD C. HADLEY

United States Patent Office 2,787,878
Patented Apr. 9, 1957

2,787,878

DRAFT ARRANGEMENT FOR CORN PICKERS

Howard C. Hadley, Des Moines, Iowa, assignor to Deere Manufacturing Co., Dubuque, Iowa, a corporation of Iowa Application May 25, 1955, Serial No. 510,924

9 Claims. (Cl. 56—18)

The present invention relates generally to crop harvesting implements and more particularly to a corn harvester of the type to be pulled to the rear of a tractor and over a field of row planted corn. Specifically it provides for a novel arrangement of the various parts making up the corn harvester that will give lateral compactness to the unit and better balance, efficiency, and durability.

The prior art concerning trail-behind corn pickers shows in most instances a picking unit positioned outwardly of one of the rear wheels of the tractor and in position to pick the row of corn adjacent to the wheel. The husking unit is mounted to the rear of the picking unit and a crop conveyor is proximate to both the picking and husking units. With this arrangement the weight of the corn harvester is concentrated mostly to the side and usually outwardly of the rear wheel of the tractor with the consequence that considerable side draft is exerted on the tractor. Effort has been made to alleviate this condition by positioning the wagon or crop receptacle on the opposite side of the tractor from the picking unit in order to balance the weight of the harvester and to move the overall center line of draft closer to coinciding with the fore-and-aft center line of the tractor. This condition however creates another problem inasmuch as the wagon straddles additional rows of corn than those already straddled by the tractor and harvester which requires those additional rows to be picked by hand or a different type of machine when opening a new field. Also, the side draft effect of the wagon is proportionate to the degree the wagon is loaded and varies throughout the harvesting operation.

Therefore, from an efficiency standpoint, it is desirable to make the harvester as laterally compact as possible and from an operational standpoint to so balance the various parts of the harvester and the tractor-harvester-wagon assembly that the center line of draft will closely approximate the fore-and-aft center line of the tractor.

A harvester having the above desired characteristics is shown and described in a present co-pending application to Evert W. Adolphson, Serial No. 427,452, filing date May 4, 1954, the subject matter of which provides for a tractor drawn corn picker which has its gathering unit in position to harvest the row of crops adjacent to and outwardly of one of the rear wheels of the tractor and has its husking units spaced transversely and on the opposite side of the corn picker from the picking unit so that it falls to the opposite side of an extension of a fore-and-aft center line of the tractor which ultimately results in the center line of draft of the harvester falling in close proximity to the tractor center line. A transverse crop elevator delivers material from the rearward end of the gathering unit to the husking unit. The harvester is also characterized by having the material discharge elevator extending fore-and-aft and positioned inwardly of the husking unit and extending in its rearward projectory beneath the transverse elevator.

In the above arrangement, the fore-and-aft extending elevator extends substantially on the fore-and-aft center line of the tractor and the husking unit is disposed to one side of the center line while the gathering unit is disposed on the opposite side of the fore-and-aft center line thereby each serving to counterbalance the side draft load of the other. Likewise, the trailing receptacle is positioned directly behind the tractor and varying amounts of load in the receptacle will not effect in any manner the resultant side draft load on the tractor.

While this latter type of corn picker has proven successful as far as balancing and stabilizing the draft load on the tractor, there have been certain problems created with such an arrangement. Foremost among these problems is one in which, due to the transverse compactness of the unit, the slope of the transverse elevator must be relatively steep in order to pass over the rearwardly projecting elevator. In many instances, and particularly when picking in heavy yields, the transverse elevator, because of its large angle of inclination, has caused ears of corn to roll back down the elevator often creating a congested area at the boot of the elevator which ultimately necessitates stopping the machine. Therefore, for maximum efficiency it is imperative that the slope of the transverse elevator should be such that this latter condition will not occur, and it is therefore the main object of the present invention to provide an arrangement of harvester parts whereby the transverse elevator is disposed to pass under the rearwardly projecting elevator thereby reducing its angle of inclination.

In reducing the slope of the transverse elevator, it obviously follows that the husking unit or at least the crop inlet end of the husking unit must also be lowered. This creates a condition in which the outlet end of the husking unit is relatively low and prevents the material discharging from the outlet end to gravitate into the boot end of the fore-and-aft extending crop discharge elevator. Therefore, it is also an object of this invention to provide an additional crop conveyor for moving material from the husking unit into the discharge elevator.

Other objects and advantages of the invention will be apparent to those skilled in the art after a consideration of the following description, in which reference is had to the drawings appended hereto, in which Fig. 1 is a plan view of the tractor-corn picker-wagon assembly (the forward portion of the tractor and the rear part of the wagon being omitted to permit a larger scale drawing) embodying the principles of the invention and showing the relation between the three vehicles during operation and their positions relative to the several rows of corn, which are indicated in broken lines in the figure.

Fig. 2 is a side elevational view of the assembly or train shown in Fig. 1. A portion of the rear wheel on the tractor has been removed to show clearly the connections between the tractor and the corn picker.

Figure 3:
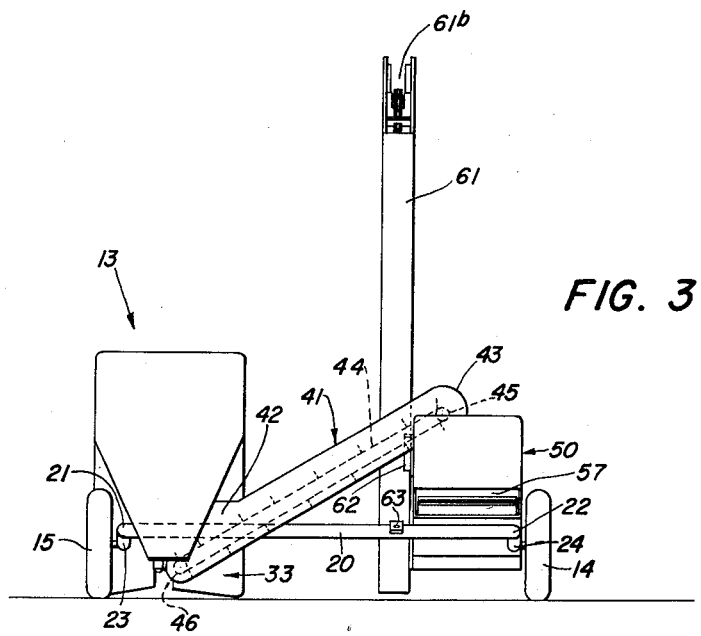
Fig. 3 is a rear elevational view of the corn picker.
Figure 5:
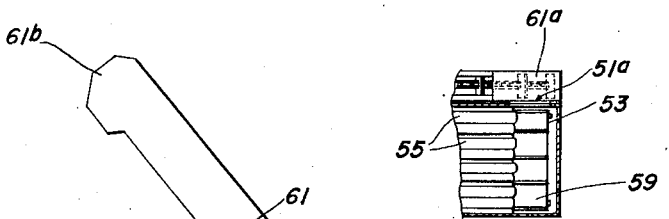
Fig. 5 is a sectional view taken along line 5—5 of Fig. 4.
Figure 4:
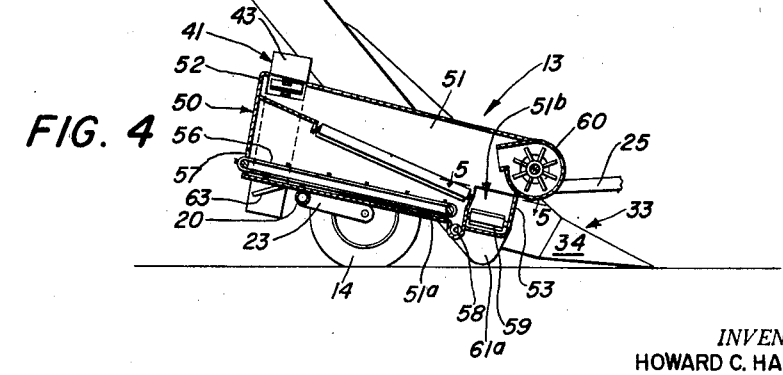
Fig. 4 is a side elevational view of the corn picker with the husking unit shown in section as seen along the line 4—4 of Fig. 1.

Referring now to Figures 1 and 2, a tractor 10 having two rear wheels 11, 12 straddling two rows of corn $R^1$, and $R^2$ has in drawn relationship to it a corn harvester 13 mounted on two transversely spaced wheels 14, 15 that straddle adjacent rows of crops $R^1$, $R^2$, and $R^3$. A trailing receptacle or wagon 16 is connected to and trails the harvester in fore-and-aft alinement with the tractor, having its wheels, of which only two front ones are visible at 17, 18, straddle the same rows of crops $R^1$, and $R^2$ as the tractor. The tractor and wagon are of a usual commercial design and for purposes of this invention will not be described in detail since it is not important to an understanding of the invention.

The corn harvester 13 has a main tubular supporting frame 20 having first and second sides 21, 22 spaced apart transversely to the line of travel and journaled at the aforementioned transversely spaced apart wheels 14, 15 through axle supporting arms 23, 24.

Extending forwardly from the tubular main frame 20, or in the direction of the tractor, is a second tubular member 25 that serves as a draft tongue and contains within it a power take off drive shaft 26. An adjustable stabilizing member 27 is pivotally connected to a midportion of the tubular member 25 and a portion of the frame 20 laterally spaced apart from the rear end of the draft tongue 25. Hitch means 30 is provided for connecting the draft tongue 25 to a tractor drawbar 31. A power take off shaft 32 of the tractor is connected by universal joints 38 and an intermediate shaft 39 to the power shaft 26.

A gathering unit 33, having gatherers 34 and 35, is carried by the main frame 20 at the first side 21 of the frame 20 just inwardly of the wheel 15. It is not unlike many of the units common to the trade and its construction will not be detailed other than is necessary to an understanding of the invention. The gatherers 34, 35 extend forwardly to gather from a row crop R³ which is adjacent to and outwardly of the tractor wheel 11. A pair of snapping rolls 36, 37 sever the ears from the stalks and drive them rearwardly in the conventional manner to a rear discharge end 40 behind the transverse center line of the wheels whence they gravitate to a receiving end 42 of a transverse crop conveyor 41. The conveyor is carried by the main frame 20 and has its receiving end 42 at a relatively low level and from there inclines upwardly and laterally to a relatively high delivery end 43 adjacent to and for delivering crops into a husking unit 50. The conveyor comprises a conventional elevator chain 44 mounted over a driven pulley 45 and a driver pulley 46. As shown in Fig. 1, the conveyor extends to opposite sides of an extension of the fore-and-aft center line of the tractor 10, having its receiving end 42 on one side and its delivery end 43 on the other.

The crop treating or husking unit 50 is disposed generally in a position to move the corn in the direction of the line of travel and has a husking chamber 51 with a rear crop-inlet end 52 substantially in transverse alinement with the rear discharge end 40 of the gathering unit 33 and directly beneath the delivery end 43 of the conveyor 41 and a crop-outlet end 53 ahead of the transverse center line of the wheels. The unit 50 is mounted to the frame 20 in a conventional manner. Inside the chamber 51 husking rolls 55 serve to remove the husks and as operative means to move the corn forwardly from the inlet end to the outlet end. Husks and trash that have been drawn between the husking rolls are moved rearwardly and out of the husking chamber by a husk conveyor 56. A husk discharge opening 57 is provided in the rear of the husking chamber 51.

The conveyor 56 also operates as an undershoot type of conveyor which engages kernels of corn which gravitate to the surface of a lower panel 51ª of the husking chamber 51 and moves them forwardly to a transverse auger 58 mounted at the forward or outlet end 53 of the husking unit. Also mounted at the forward end of the husking chamber is a flight type of belt conveyor 59 which moves the ears of corn leaving the forward end of the husking rolls 55 transversely and inwardly and through a suitable discharge opening 51ᵇ in the inner panel of the husking chamber 51. Thus, the auger type conveyor 58 and the belt conveyor 59 serves as conveyor means for moving treated or husked corn from the husking unit to a fore-and-aft extending crop discharge elevator 61.

Supported at the forward end of the husking chamber 51 is a cleaning fan 60 which directs a blast of air at the husking rolls 55 and operates to drive loose husks and the foreign matter into the husking rolls which in turn passes it through the rolls to the upper flight of the conveyor 56. The purpose of the fan 60 is to prevent husks and foreign matter from passing forwardly onto the transverse conveyors 58 and 59 and to aid in their removal from the chamber.

A discharge elevator intake end 61ª is provided adjacent to and inwardly of the husking unit 50 and is positioned to receive both the shelled corn and the husked ears of corn moving inwardly by the conveyors 58 and 59 and through the discharge opening 51ᵇ. The wagon elevator 61 is supported on suitable framework as at 62, which is fixed as by welding or other means to the innermost side of the husking unit 50. The elevator 61 is disposed laterally inwardly of the treating unit and has besides its relatively low forward or hopper end 61ª a relatively high rear or discharge end 61ᵇ positioned rearwardly of the aforesaid center line of the wheels 14, 15. The elevator 61 extends above the transverse conveyor 41 and is substantially in fore-and-aft alinement with the aforesaid hitch means 30.

Rear hitch means of a suitable nature referred to as 63 is mounted on the main tubular frame 20 for receiving the forward end of a tongue 64 connecting the trailing receptacle 16 to the harvester. The hitch 63 is positioned so that the receptacle will travel directly rearwardly of the tractor.

Various other modifications and alterations in the preferred embodiment of the invention disclosed herein, as well as the accomplishment of specific objects and features not specifically enumerated, will undoubtedly occur to those skilled in the art. It is not the intention therefore to limit the invention to the form shown herein.

What is claimed is:

1. A crop-harvester adapted to be drawn over a field of row-planted crops, comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor; a gathering unit carried on the first side of the main frame and extending forwardly to gather from a crop row and having a rear discharge end; a crop-treating unit carried on the second side of the main frame in laterally spaced relation to the gathering unit, said treating unit having a rear crop-inlet end substantially in transverse alinement with the rear discharge end of the gathering unit and a forward crop-outlet end; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the inlet end to the outlet end thereof; and a fore-and-aft extending elevator carried by the main frame laterally inwardly of the treating unit and having a relatively low forward end proximate to and for receiving crops from the outlet end of the treating unit and a relatively high rear end and so disposed in its rearward projectory so as to extend above the transverse conveyor.

2. A crop-harvester adapted to be drawn over a field of row-planted crops, comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor; a gathering unit carried on the first side of the main frame and extending forwardly to gather from a crop row and having a rear discharge end; a crop-treating unit carried on the second side of the main frame in laterally spaced relation to the gathering unit, said treating unit having a crop-inlet end and a crop-outlet end; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the inlet end to the outlet end thereof; and a fore-and-aft extending elevator carried by the main frame laterally inwardly of the treating unit and having a relatively low forward end proximate to and for receiving crops from the outlet end of the treating unit and a relatively high rear end and so disposed in its rearward projectory so as to extend above the transverse conveyor.

3. A crop-harvester adapted to be drawn over a field of row-planted crops, comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor; a gathering unit carried on the first side of the main frame and extending forwardly to gather from a crop row and having a rear discharge end; a crop-treating unit carried on the second side of the main frame in laterally spaced relation to the gathering unit, said treating unit having a crop-inlet end and a crop-outlet end; a transverse crop conveyor carried by the main frame and having a receiving end adjacent to and for receiving crops from the gathering unit discharge end and a delivery end adjacent to and for delivering crops into the inlet end of the treating unit; means operative in said treating unit for causing crops to move from the inlet end to the outlet end thereof; and a fore-and-aft extending elevator carried by the main frame laterally inwardly of the treating unit and having a relatively low forward end proximate to and for receiving crops from the outlet end of the treating unit and a relatively high rear end and so disposed in its rearward projectory so as to extend above the transverse conveyor.

4. The invention defined in claim 3, in which the means operative in the treating unit for causing crops to move from the inlet end to the outlet end thereof includes material conveyor means for receiving treated crops and moving them to a material discharge opening in the outlet end.

5. A crop-harvester adapted to be drawn over a field of row-planted crops, comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor; a gathering unit carried on the first side of the main frame and extending forwardly to gather from a crop row and having a rear discharge end; a crop-treating unit carried on the second side of the main frame in laterally spaced relation to the gathering unit, said treating unit having a rear crop-inlet end substantially in transverse alinement with the rear discharge end of the gathering unit and a forward crop-outlet end; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the rear to the forward end thereof; a fore-and-aft extending elevator carried by the main frame laterally inwardly of the treating unit and having a relatively low forward end proximate to and for receiving crops from the outlet end of the treating unit and a relatively high rear end and so disposed in its rearward projectory so as to extend above the transverse conveyor, and rear hitch means on the main frame for connecting to the main frame a trailing receptacle adapted to receive crops from the rear end of the elevator.

6. A crop-harvester adapted to be drawn over a field of row-planted crops, comprising: a main frame having first and second sides spaced apart transversely to the line of travel and supported by laterally spaced apart wheels that straddle the rows of crops; a draft tongue connected to the main frame and extending forwardly and having a forward end provided with hitch means for connection to a tractor along a line of draft inwardly of said first and second sides; a gathering unit carried on the first side of the main frame and extending forwardly to gather from a crop row and having a rear discharge end; a crop-treating unit carried on the second side of the main frame in laterally spaced relation to the gathering unit, said treating unit having a rear crop-inlet end substantially in transverse alinement with the rear discharge end of the gathering unit and a forward crop-outlet end; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the inlet end to the outlet end thereof; a fore-and-aft extending elevator carried by the main frame laterally inwardly of the treating unit and having a relatively low forward end proximate to and for receiving crops from the outlet end of the treating unit and a relatively high rear end and so disposed in its rearward projectory so as to extend above the transverse conveyor, the rear end of said elevator being substantially centered on a rearward continuation of the aforesaid line of draft; and rear hitch means on the main frame substantially centered on the said line of draft for connecting to the main frame a trailing receptacle adapted to receive crops from the rear end of the elevator.

7. A crop-harvester adapted to be drawn over a field of row-planted crops, comprising: a main frame; a pair of supporting wheels carrying the main frame and spaced apart transversely to the line of travel to straddle the rows of crops; a draft tongue connected to the main frame intermediate the wheels and extending forwardly, said tongue having a forward end provided with hitch means for connection to a tractor along a line of draft inwardly of one of the supporting wheels; a gathering unit carried by the main frame just inwardly of the other wheel and extending forwardly to gather from the other row of said wheel-straddled pair of rows; said gathering unit having a rear discharge end behind the transverse center line of the wheels; a crop-treating unit carried by the main frame in laterally spaced relation to the gathering unit and proximate to said one wheel, said treating unit having a rear crop-inlet end substantially in transverse alinement with the rear discharge end of the gathering unit and said treating unit having a crop-outlet end ahead of the transverse center line of the wheels; a transverse crop conveyor carried by the main frame and having a receiving end at a relatively low level adjacent to and for receiving crops from the gathering unit discharge end, said conveyor inclining upwardly and laterally to a delivery end adjacent to and for delivering crops into the inlet end of the treating unit; means operative in said treating unit for causing crops to move from the inlet end forwardly toward the outlet end and including transverse conveyor means at the outlet end for receiving treated crops and moving them laterally inwardly; a fore-and-aft extending elevator carried by the main frame laterally inwardly of the treating unit and having a relatively low forward end proximate to and for receiving crops from the transverse conveyor means at the outlet end of the treating unit and a relatively high rear end rearwardly of the aforesaid center line of the wheels, said elevator extending above the transverse conveyor, the rear end of the elevator being substantially centered on a rearward continuation of the aforesaid line of draft; and rear hitch means on the main frame substantially centered on said line of draft for connecting to the main frame a trailing receptacle adapted to receive crops from the rear end of the elevator.

8. A crop-harvester adapted to be drawn over a field of row-planted crops, comprising: a main frame; a pair of supporting wheels carrying the main frame and spaced apart transversely to the line of travel to straddle the rows of crops; a draft tongue connected to the main frame intermediate the wheels and extending forwardly, said tongue having a forward end provided with hitch means for connection to a tractor; a gathering unit carried by the main frame just inwardly of the other wheel and extending forwardly to gather from the other row of said wheel-straddled pair of rows; said gathering unit having a rear discharge end behind the transverse center line of the wheels; a crop-treating unit carried by the main frame in laterally spaced relation to the gathering unit and proximate to said one wheel, said treating unit having a rear crop-inlet end substantially in transverse alinement with the rear discharge end of the gathering unit and said treating unit having a crop-outlet end ahead of the transverse center line of the wheels; a transverse crop conveyor carried by the main frame and having a receiving end at a relatively low level adjacent to and for receiving crops from the gathering unit discharge end, said conveyor inclining upwardly and laterally to a relatively high delivery end adjacent to and for delivering crops into the inlet end of the treating unit; means operative in said treating unit for causing crops to move from the inlet end to the outlet end thereof; a fore-and-aft extending elevator carried by the main frame laterally inwardly of the treating unit and having a relatively low forward end proximate to and for receiving crops from the outlet end of the treating unit and a relatively high rear end rearwardly of the aforesaid center line of the wheels, said elevator extending above the transverse conveyor and above the center line of the wheels; and rear hitch means on the main frame for connecting to the main frame a trailing receptacle adapted to receive crops from the rear end of the elevator.

9. A crop-harvester adapted to advance over a field comprising: a mobile frame disposed transversely to the line of advancement; a gathering unit carried on the frame; a crop-treating unit carried on the frame in laterally spaced relation to the gathering unit, a crop conveyor carried by the frame for delivering crops from the gathering unit to the treating unit; and a fore-and-aft extending elevator carried by the frame laterally inwardly of the treating unit and having a relatively low forward end proximate to and for receiving crops from the treating unit and a rear discharge end remote from the treating unit and passing in its rearward projectory over the crop conveyor.

References Cited in the file of this patent

UNITED STATES PATENTS

| | | |
|---|---|---|
| 1,785,647 | Powell | Dec. 16, 1930 |
| 2,492,897 | Siefken | Dec. 27, 1949 |